United States Patent
Krapf et al.

(10) Patent No.: US 7,851,957 B2
(45) Date of Patent: Dec. 14, 2010

(54) MAGNETIC BEARING ASSEMBLY FOR ROTATABLE SUPPORT APPARATUS

(75) Inventors: Wallace A. Krapf, Macedon, NY (US); John Deats, Brockport, NY (US); Ryan J. O'Connell, Newark, NY (US)

(73) Assignee: W.A. Krapf, Inc., Macedon, NY (US)

( * ) Notice: Subject to any disclaimer, the term of this patent is extended or adjusted under 35 U.S.C. 154(b) by 879 days.

(21) Appl. No.: 11/605,707

(22) Filed: Nov. 28, 2006

(65) Prior Publication Data

US 2008/0120876 A1 May 29, 2008

(51) Int. Cl.
  *H02K 7/09* (2006.01)
  *H02K 37/00* (2006.01)
  *H02K 49/00* (2006.01)
  *H02K 5/10* (2006.01)
  *H02K 21/26* (2006.01)
  *H02K 23/04* (2006.01)
  *H02N 2/00* (2006.01)

(52) U.S. Cl. .................. 310/90.5; 310/49.31; 310/103; 310/104; 310/154.16; 310/154.36; 310/368

(58) Field of Classification Search .................. 40/124; 310/103, 104, 156.08, 156.32, 154.32, 154.25, 310/154.16, 49.31, 49.2, 368, 90.5, 49.22; 417/420
See application file for complete search history.

(56) References Cited

U.S. PATENT DOCUMENTS

| 2,254,698 | A |   | 9/1941  | Hansen, Jr.  |          |
|-----------|---|---|---------|--------------|----------|
| 2,340,122 | A |   | 1/1944  | Hansen, Jr.  |          |
| 2,585,788 | A |   | 1/1952  | Mendelsohn   |          |
| 2,585,714 | A |   | 2/1952  | Wrobel et al.|          |
| 2,725,266 | A |   | 11/1955 | Menselsohn   |          |
| 2,747,944 | A |   | 5/1956  | Baermann     |          |
| 3,029,824 | A | * | 4/1962  | Goodell      | 131/240.1|
| 3,114,582 | A |   | 12/1963 | Milligan     |          |
| 3,196,566 | A |   | 7/1965  | Littlefield  |          |
| 3,243,238 | A |   | 3/1966  | Lyman        |          |
| 3,493,274 | A |   | 2/1970  | Emslie et al.|          |
| 3,614,181 | A |   | 10/1971 | Meeks        |          |

(Continued)

FOREIGN PATENT DOCUMENTS

JP        02255465 A  *  10/1990

OTHER PUBLICATIONS

Partial Translation (Abstract and Constitution) JP02255465A (1990).*

*Primary Examiner*—Quyen Leung
*Assistant Examiner*—Jose A Gonzalez Quinones
(74) *Attorney, Agent, or Firm*—Hiscock & Barclay, LLP

(57) ABSTRACT

A magnetic bearing assembly for a rotatable support apparatus includes a first stationary section, a second section disposed on the first section and a shaft member secured to the base section and passing through the first section. The shaft member defines an axle for rotation for the first section wherein the magnetic bearing assembly is defined by at least one pair of magnets disposed in relation to the shaft member, the at least one pair of magnets including magnetic face surfaces aligned such that a repelling field is established between the at least one pair of magnets, wherein the first section is attached to at least one of the magnets.

4 Claims, 7 Drawing Sheets

U.S. PATENT DOCUMENTS

| | | |
|---|---|---|
| 3,793,275 A | 2/1974 | Stone et al. |
| 3,874,778 A | 4/1975 | Kato et al. |
| 4,405,286 A | 9/1983 | Studer |
| 4,432,441 A * | 2/1984 | Kurokawa .................. 188/267 |
| 4,486,729 A | 12/1984 | Lee |
| 4,563,046 A | 1/1986 | Shimamoto |
| 4,819,388 A * | 4/1989 | Kirkland ..................... 451/76 |
| 5,043,615 A | 8/1991 | Oshima |
| 5,182,533 A | 1/1993 | Ritts |
| 5,610,463 A | 3/1997 | Dunfield et al. |
| 5,616,976 A | 4/1997 | Fremerey et al. |
| 5,619,083 A | 4/1997 | Dunfield et al. |
| 5,635,784 A | 6/1997 | Seale |
| 5,894,181 A * | 4/1999 | Imlach ..................... 310/90.5 |
| 5,986,373 A | 11/1999 | Stucker |
| 6,262,505 B1 | 7/2001 | Hockney et al. |
| 6,806,605 B1 | 10/2004 | Gabrys |
| 7,117,998 B2 | 10/2006 | Krapf |
| 2003/0029066 A1* | 2/2003 | Venn .......................... 40/493 |
| 2003/0197439 A1 | 10/2003 | Kuipers et al. |
| 2004/0021381 A1 | 2/2004 | Garvey |
| 2005/0242262 A1 | 11/2005 | Krapf et al. |
| 2006/0028203 A1* | 2/2006 | Kawashima et al. ... 324/207.25 |

* cited by examiner

MAGNETIC BEARING ASSEMBLY FOR ROTATABLE SUPPORT APPARATUS

FIELD OF THE INVENTION

This invention relates to the field of rotating support structures and in particular to a magnetic bearing assembly for a rotatable support structure; such as, for example, a kiosk that is capable of displaying multimedia items.

BACKGROUND OF THE INVENTION

A number of support systems are known for displaying a plurality of graphic media materials, including photographs, articles, schedules, lists and other similar items. One such system, manufactured by the W.A. Krapf, Co. of Macedon, N.Y., is defined by a plurality of planar support members or panels that are interconnected into a cubic framework forming an upper display portion. The upper display portion is supported for rotation on a stationary base portion via a turntable or other means. The planar support panels can include corkboards, white dry erase boards, or other panels that can be used for displaying purposes. The base portion supports the upper display portion and the turntable permits rotation of the tipper display portion by the user.

An improved version of this type rotatable supporting structure is described in commonly owned U.S. patent application Publication No. 2005/0242262 A1, and is shown in FIGS. 1-3.

The rotatable support structure/apparatus 120 according to the improved version is defined by two primary components; namely, a stationary or fixed base portion 124 as well as a display portion 128 that is mounted for rotation on top of the stationary base portion. The upper display portion 128 is defined by a pair of covers; namely, a top cover 132 and a bottom cover 136, as well as four lateral or side panels 140, 144 that define an interior. Each of the side panels 140, 144 are attached to one another by means of a plurality of vertically extending sections 147, wherein each of the extending sections has a pair of spaced slots 149 for permitting peripheral edges of each side panel to be inserted. The stationary base portion 124 is further defined by respective top and bottom covers 152, 156, as well as a plurality of lateral surfaces 148 that together comprise a cubic configuration.

Referring to FIGS. 2 and 3, the rotatable support apparatus 120 further includes a vertically disposed pole or shaft 160 mounted to the bottom of the base portion and extending through the interiors of each of the stationary base portion 124 and the upper display portion 128. An intermediate top panel 166, made from wood or other structural material, is interposed between the top cover 132 and the hollow interior of the upper display portion 128. This intermediate panel 166 is used to distribute the weight of the display portion 128, wherein an insert 188 is fitted to the top end of the pole 160, which is press fitted therein. The insert 188 includes a threaded portion 180 extending through the entire intermediate top panel 166 wherein the upper display portion is fixedly attached using a nut 185 and washers 184, 186. The nut 185 is engaged sufficiently to provide attachment, but not restrict rotation of the upper display portion 128. The interface between the intermediate top panel 166 and the pole 160 also includes a washer 189 introduced therebetween, wherein the upper display portion, including the intermediate top panel 166 is selectively rotated about the axis defined by the vertically disposed pole 160.

The attachment scheme for this structure 120 presents issues in that considerable frictional forces are developed when rotating the upper display portion 128 by the user. Moreover and though the above rotatable supporting structure is workable with numerous forms of display apparatus, it should be noted that there are varying sizes often required for such supporting structures. As such, even greater friction loads can be developed. Each of the foregoing can make it relatively difficult for the user to easily rotate the upper display portion of the apparatus

SUMMARY OF THE INVENTION

Therefore and according to one aspect, there is disclosed a magnetic bearing assembly for a rotatable support apparatus, said rotatable support apparatus comprising a first stationary section, a second section disposed on said first section and a shaft member secured to said base section and passing through said first section, said shaft member defining an axle for rotation for said first section. The magnetic bearing assembly comprises at least one pair of magnets disposed in relation to the shaft member, the at least one pair of magnets including magnetic face surfaces aligned such that a repelling field is established between the at least one pair of magnets, wherein the first section is attached to at least one of the magnets.

The at least one pair of magnets in one version are attached in relation to an upper end of the shaft member, the pair of magnets including at least a first magnet stationarily attached to the shaft member and a second magnet attached to the first section. A threaded insert is attached to the shaft member end, the threaded insert including a threaded shank portion that extends through each of said at least one pair of magnets. The first portion includes a frame supporting a set of display panels, the frame including a top portion that receives the threaded shank, the apparatus including a nut that can be selectively tightened against the upper portion to create a biasing force to promote the repelling magnetic field.

According to another version a pair of guide members is provided, each of the guide members having a center opening sized for receiving the shaft member. Each of the guide members is disposed on each of the first and the second sections and each include at least one magnet, wherein the pair of guide members is disposed such that alternating polarities are provided circumferentially thereabout. Each of the guide members are disposed such that a repelling magnetic field is created between the pair of guide members during at least a portion of a rotation of the first section and an attracting magnetic field is established during another portion of the rotation. The attracting magnetic field is established to provide indexing means for causing the first section to be rotated to a predetermined rotational position relative to the stationary second section.

The created magnetic bearing assembly is passive in nature wherein in one version, the rotatable support structure is a display kiosk in which a multi-sided rotatable display portion is rotated about the axle defined by the shaft member. A set of display panels can be supported in a cubic or other suitable polyhedral configuration.

According to another version, a rotatable support apparatus comprises: a stationary base section; an upper display section disposed above the base section; a shaft member extending through the base portion and the upper display portion, the pole member having one end mounted to the base section and defining an axis that permits rotation of the upper display section; and at least one pair of magnets disposed in relation to the shaft member. The at least one pair of magnets are aligned such that a repelling field is established between the at least one pair of magnets, wherein the upper display section is attached to at least one of the magnets, the at least one pair of magnets creating a magnetic bearing assembly.

A first magnet is attached, in one variation, to the shaft member and a second magnet is attached to the upper display portion wherein the first magnet and the second magnet are each attached onto an insert attached to the upper end of the shaft member. The insert includes a shank portion attachable to an upper part of the upper display portion and extending therethrough, said assembly including a nut for engaging onto the extending part of said shank portion for creating a biasing force for said magnets.

According to another variation, a first guide member is attached to the bottom surface of the upper display portion and a second guide member attached to a top surface of the base portion, each of the guide members including a through opening sized to receive the shaft member wherein the at least one pair of magnets are disposed on opposite facing surfaces of the guide members to create a repelling magnetic field therebetween. Preferably, the polarities of the guide members alternate such that repelling magnetic field is created during a portion of the rotation of the upper display portion and an attractive magnetic field is created during other portions of the rotation. The attractive magnetic field causes the upper display portion to be indexed to at least one predetermined rotational position when rotation ceases.

An advantage of the above supporting rotatable structure is the elimination of conventional bearing surfaces and therefore less incidence of wear in that no friction is developed between mounting surfaces. Therefore, substantially less force is required for rotation to occur and as a result, larger sized rotatable supporting structures can easily be handled by a user.

These and other features and advantages will become readily apparent from the following Detailed Description which should be read in conjunction with the accompanying drawings.

DETAILED DESCRIPTION

Figure 1:
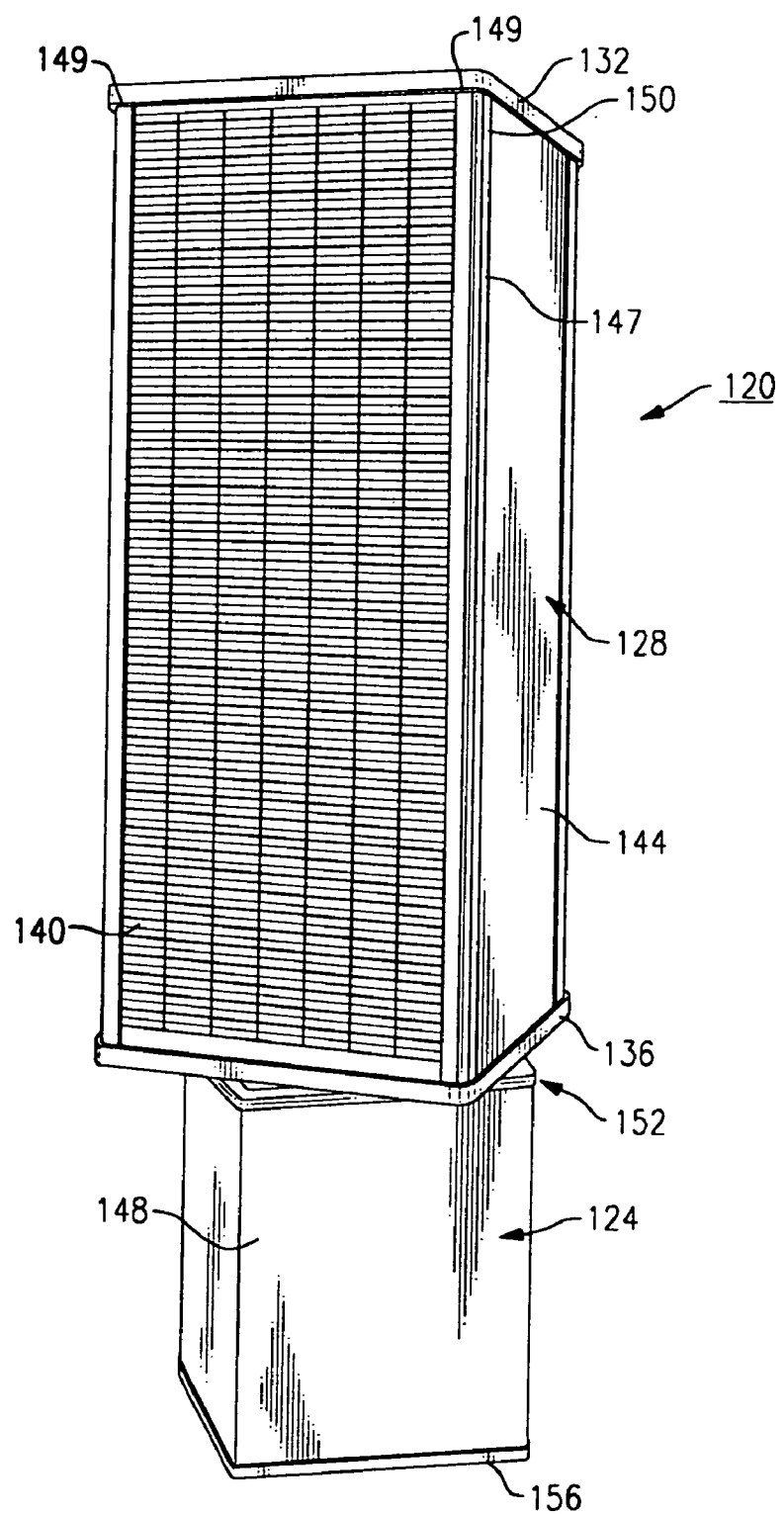
FIG. 1 is a front perspective view of a prior art rotatable support structure.
Figure 2:
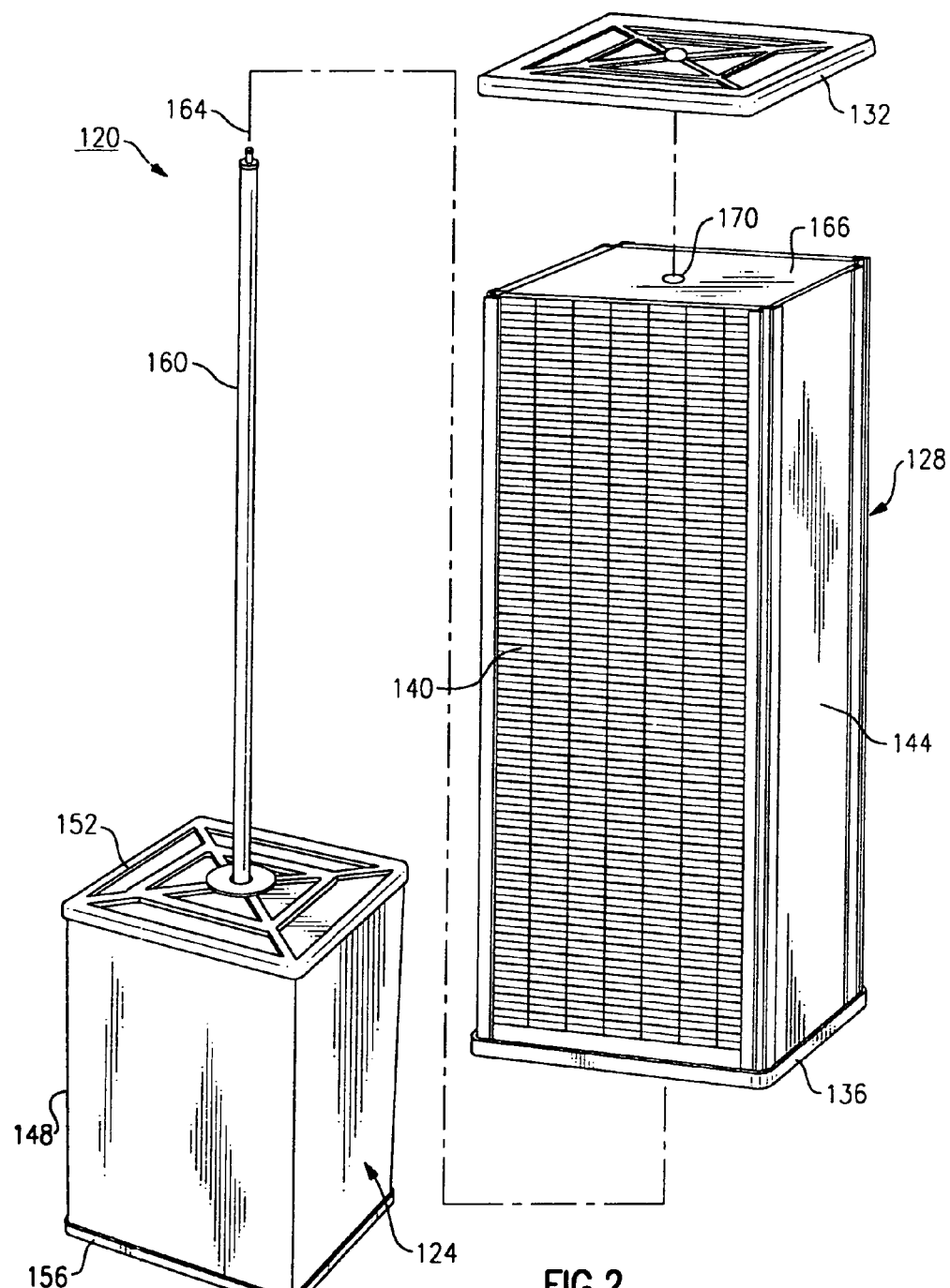
FIG. 2 is a partially exploded view of the prior art rotatable support apparatus of FIG. 1.
Figure 3:
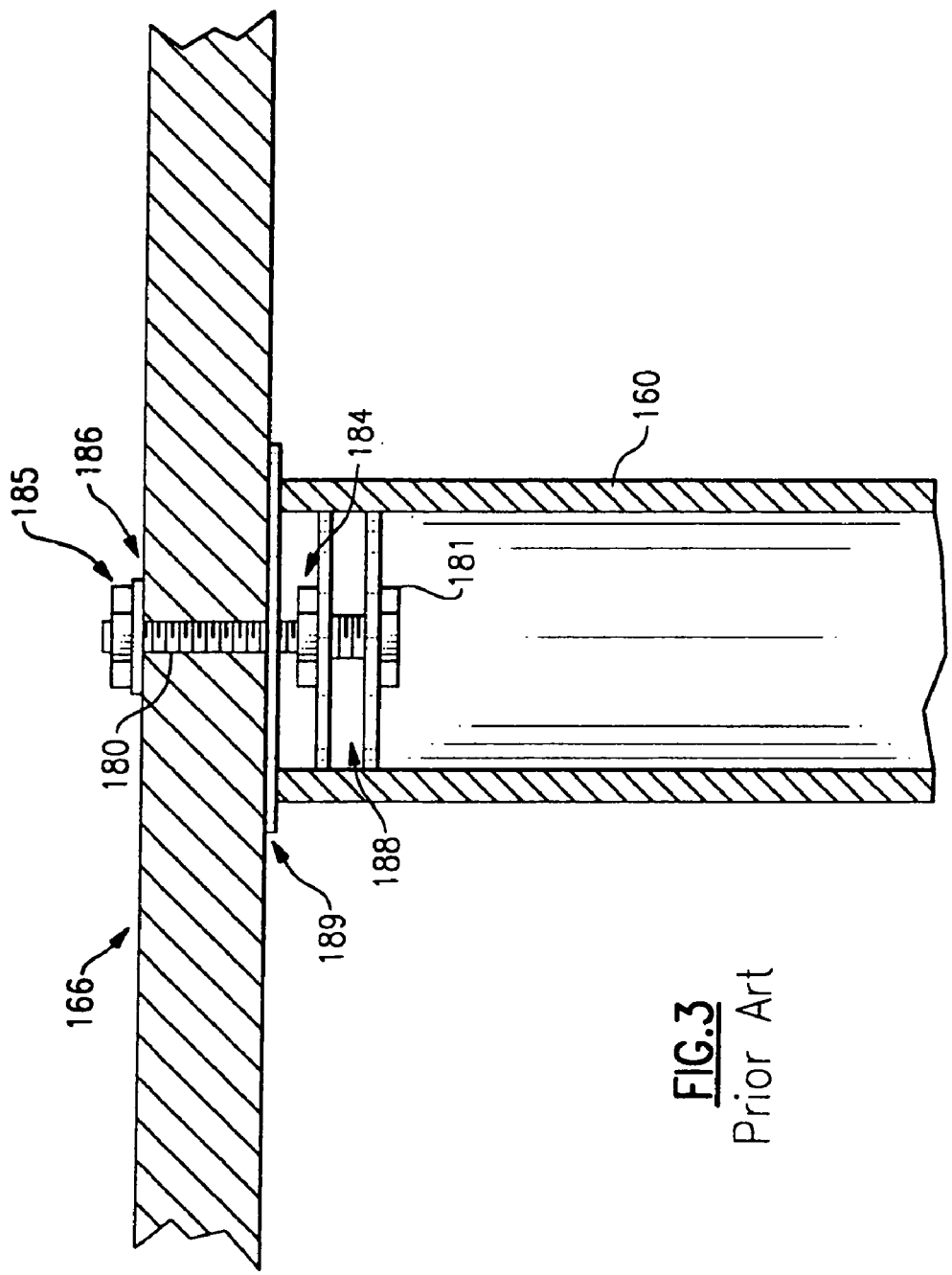
FIG. 3 is a sectioned view, illustrating the attachment of a vertically extending member relative to the top of the rotatable tipper display portion of the prior art support structure of FIGS. 1 and 2.
Figure 4:
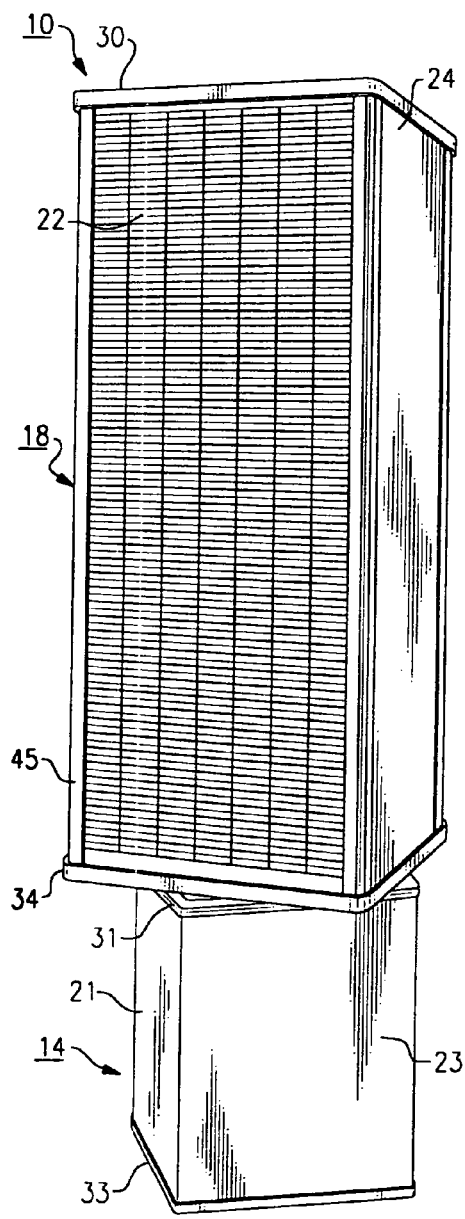
FIG. 4 is a front perspective view of a rotatable support structure in accordance with a first exemplary embodiment.
Figure 5:
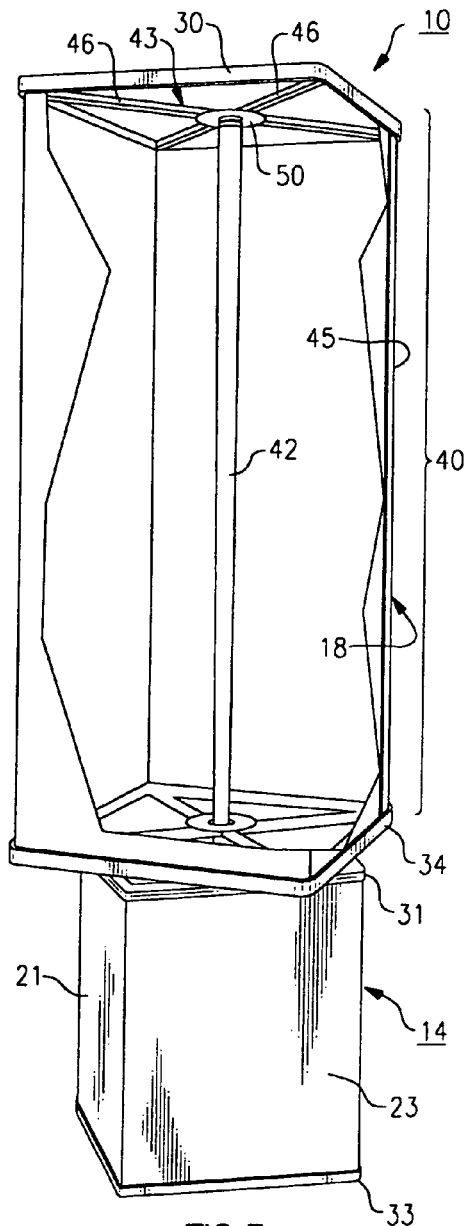
FIG. 5 is the front perspective view of the rotatable support structure of FIG. 4, partially broken away, to illustrate the interior of the upper display portion thereof.

Referring to FIGS. 4-8, there is shown a rotatable support apparatus 10 in accordance with a first exemplary embodiment, the apparatus including a stationary lower base portion 14 that supports a rotatable upper display portion 18.

The upper display portion 18, according to this embodiment, is defined by a substantially cubic configuration that includes four (4) facing or lateral panels, only two of which 22, 24 being shown, as well as a complimentary top plate 30 and a bottom plate 34. The aspect ratio of this display portion 18 is approximately 4:1; that is, in terms of height to width. However, it will be readily apparent that this aspect ratio can be easily varied; depending, for example, upon the user's application. Additionally, the upper display portion can assume other geometries; that is, other polyhedral and even circular or substantially circular configurations. Each of these referred to panels and plates are planar, wherein the upper display portion 18 supports each of the lateral panels 22, 24 by means of a frame 40, more completely shown in FIG. 5. The panels 22, 24 can include dry erase boards, cork boards, bulletin boards, or other form of flat planar display capable of displaying various forms of graphic media, such as photographs, articles, lists, schedules and the like. A graphic media materials carrier that is suitable for such uses is described in U.S. Pat. No. 7,117,998, the entire contents of which are herein incorporated by reference. The frame 40 consists of a set of vertically extending corner posts 45, each of the posts having lateral slots on opposing sides that are sized to receive a peripheral edge of a display panel 22, 24 therein. A top portion 43 of the frame 40 includes a pair of interlocking cross braces 46 that are attached by fasteners (not shown) to the top of each corner post 45. The bottom ends of each corner post 45 are inset into the bottom plate 34, which is made from a durable plastic according to this embodiment, as is the top plate 30. A center weldment 50 is provided at the bottom of one of the cross braces 46, this weldment being circular, according to this embodiment, and forming a bottom surface. The top plate 30 includes a pair of angled interior depressions (not shown) that permits the cross braces of the top portion 43 of the frame 40 to fit therein and permit the top plate to fitted conveniently to the top of the assembly. A sign or other fixture (not shown) can also be attached onto the top of the upper display portion 18, such as a marquis.

The stationary lower base portion 14 of the herein described rotatable apparatus 10 is also defined by a substantially cubic configuration and includes a plurality of lateral surfaces 21, 23, as well as respective top and bottom plates 31, 33. The lower base portion 14 is considerably smaller in height than that of the upper support portion 18. According to this embodiment, the lower base portion 14 has an aspect ration of about 2.5:1 (height to width), wherein the height of the upper display portion 18 is approximately 3.5-4 times the height of the lower base portion and the width of the upper display portion is slightly larger than that of the lower base portion. Each of these parameter can be suitably varied, however, provided that the lower base portion 14 provides sufficient stability for the upper display portion 18. The lateral sides 21, 23 of the lower base portion 14 are formed, according to this embodiment, from a single section of a plastic material, such as acrylonitrile-butadiene-styrene (ABS) or other formable and durable plastic, that is shaped or molded into a four (4) sided configuration and supported by the top and bottom plates 31, 33 between which the peripheral top and bottom edges of each of the lateral surfaces 21, 23 are supported.

A hollow shaft or pole member 42 is attached to and extends vertically upward from the bottom plate 33 of the lower base portion 14, the pole member further extending through a set of corresponding openings that are formed in each of the top plate 31 of the lower base portion and the bottom plate 34 of the upper display portion 18, respectively, into and through the interior of the upper display portion 18. The shaft member 42, according to this embodiment, is made from steel, though other structural materials can easily be substituted, wherein the shaft member forms a rotational axis upon which the upper display portion 18 is supported for rotation. The shaft member 42 is sized such that the top plate 31 of the lower base portion 14 and the bottom plate 34, of the upper display portion 18 are separated from one another to prevent interference when the upper display portion is rotated, as described below.

Figure 7:
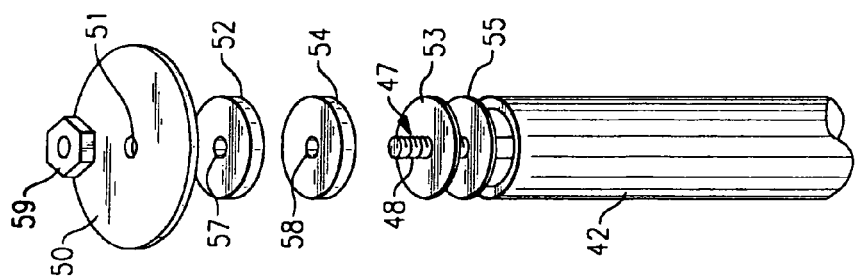
FIG. 7 is an exploded view of the top end of the upper display portion shown in FIG. 6.
Figure 8:
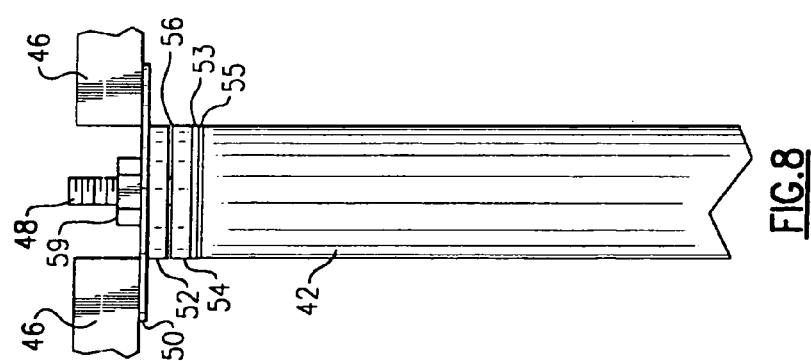
FIG. 8 is an assembled view of the top end of the upper display portion of the structure shown in FIGS. 6 and 7.

As noted, the shaft member 42 extends vertically upward to the top plate 30 of the upper display section 18. Referring to FIGS. 7 and 8, a threaded insert 47 is attached to each of the upper and lower shaft ends of the pole member 42. The threaded insert 47, according to this embodiment, is defined by a threaded shank 48 that includes a pair of parallel spaced locking elements 49, shown only in FIG. 9, each of which engage the interior of the shaft member 42 in a manner, as described in U.S. patent application Publication No. 2005/0242262 A1, the entire contents of which are herein incorporated by reference.

Figure 6:
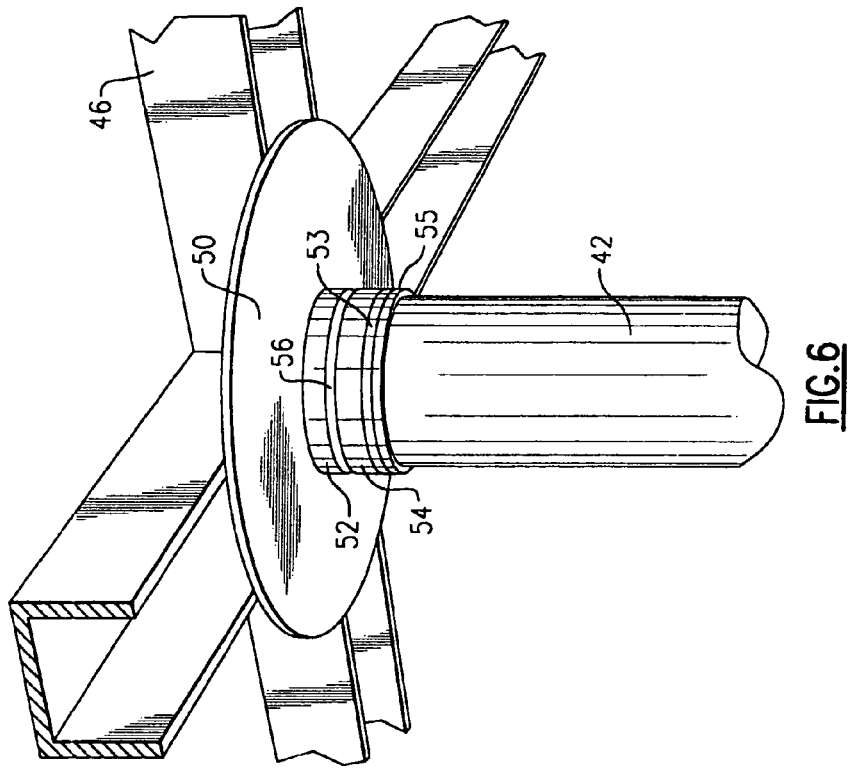
FIG. 6 is an enlarged view of the top of the upper display portion of the rotatable support stricture of FIGS. 4 and 5, including an attached magnetic bearing assembly.

As depicted in FIGS. 6-8, the shaft member 42 is attached to the upper display portion 18 and more particularly to the top portion 43 of the frame 40 to permit rotation of the upper display portion about the shaft member. A pair of washers 53, 55 is attached onto the threaded shank 48, each of the washers being at least slightly larger than the inner diameter of the shaft member 42. A pair of disk-shaped rare earth magnets 52, 54 are also disposed in stacked relation atop the washers 53, 55 at the upper end of the shaft member 42, wherein each of the magnets include aligned center openings 57, 58, enabling their placement onto the threaded shank 48 of the insert 47. The top surface of the lower magnet 54 and the bottom surface of the upper magnet 52 have like polarities such that a repelling magnetic field is created as well as a predetermined gap or spacing 56 between the magnets. The magnets 52, 54 are defined herein by a rotatable upper magnet 52 and a stationary lower magnet 54, each of which are retained by means of the threaded insert 47, which is provided through the center of the aligned discs. According to this embodiment, the magnets 52, 54 are made from niobium, though other ferromagnetic materials can be utilized.

The threaded insert 47 is further engaged with a center opening provided in the center weldment 50 that is provided in one of the cross braces 44, as shown in FIG. 8, with a portion of the threaded shank 48 extending therethrough. A nut 59, also as shown in FIG. 8, is used to secure the top portion 43 of the frame 40 to the threaded insert 47 and also to provide biasing in the form of an axial load as applied by the nut 59 that pushes the frame 40 onto the upper rotatable magnet 52 and therefore creates a force against the repelling force of the magnets 52, 54 with the lower magnet 54 being retained in a stationary axial position against the end of the shaft member 42. A working distance (gap) of about 0.031 inches is maintained, according to this specific embodiment, though this parameter can be varied depending on the relative strength of the magnets 52, 54 and the weight of the upper display portion 18, among other parameters.

Though not shown the lower or bottom end of the shaft member 42 is fitted into the hollow interior of the base portion 14 using a similar threaded insert (not shown) that is fixedly attached to the bottom plate 33. A set of weights (not shown) can be added to balance the apparatus.

In operation, a user can then rotate the upper display portion 18 of the apparatus 10 by gripping one of the support posts 45 and applying a force wherein the portion is caused to rotate about the stationary base portion 14 and more particularly about the vertical axis that is formed by the stationary shaft member 42. The incorporation of the pair of magnets 52, 54 at the upper end of the upper display portion 18 creates a passive magnetic bearing assembly that enables smooth effortless operation with less force being required to rotate the tipper display portion 18 than in previous versions.

Figure 9:
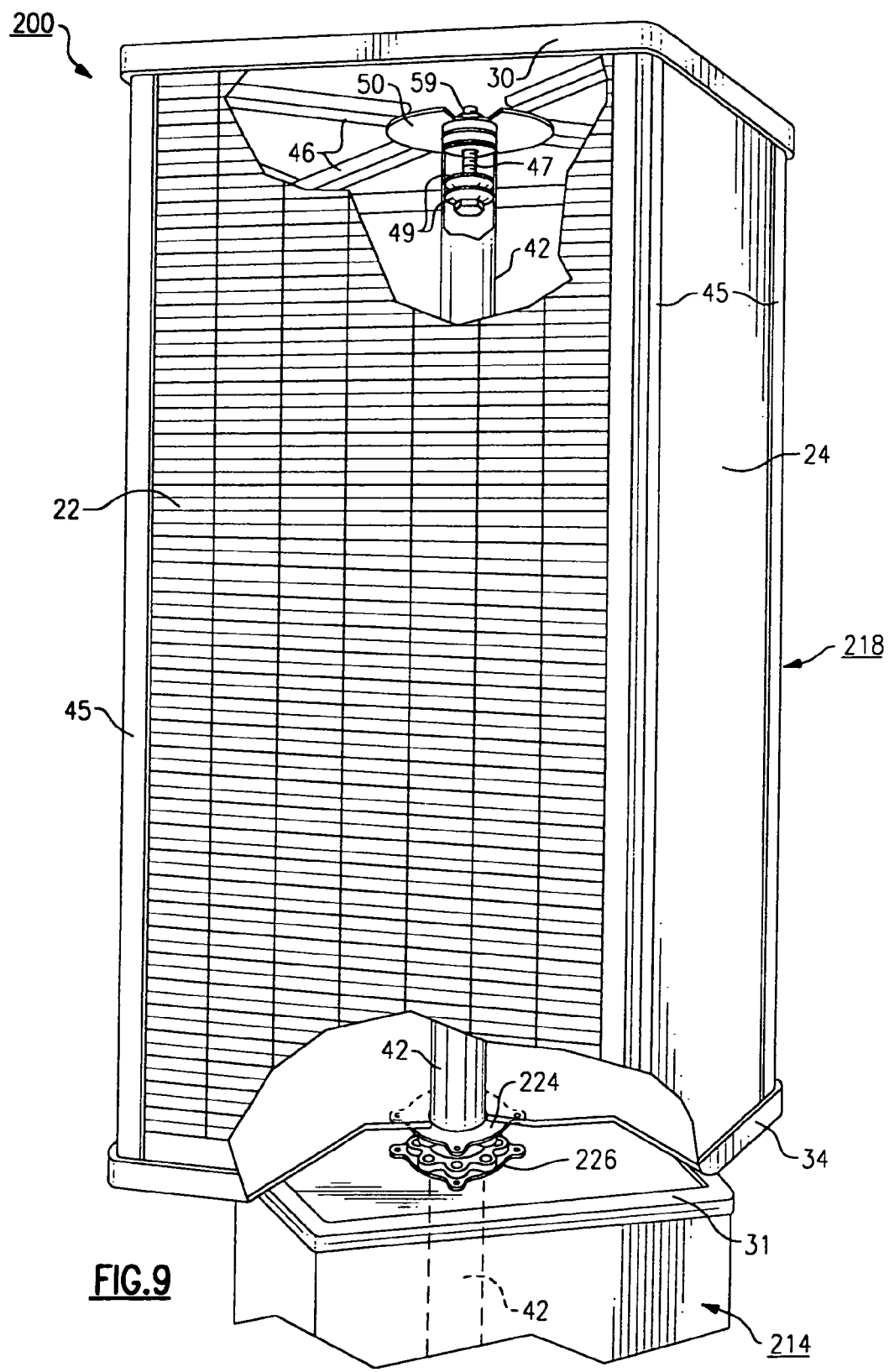
FIG. 9 is a partial front perspective view, partially broken away, of a rotatable support structure in accordance with a second embodiment.
Figure 10:
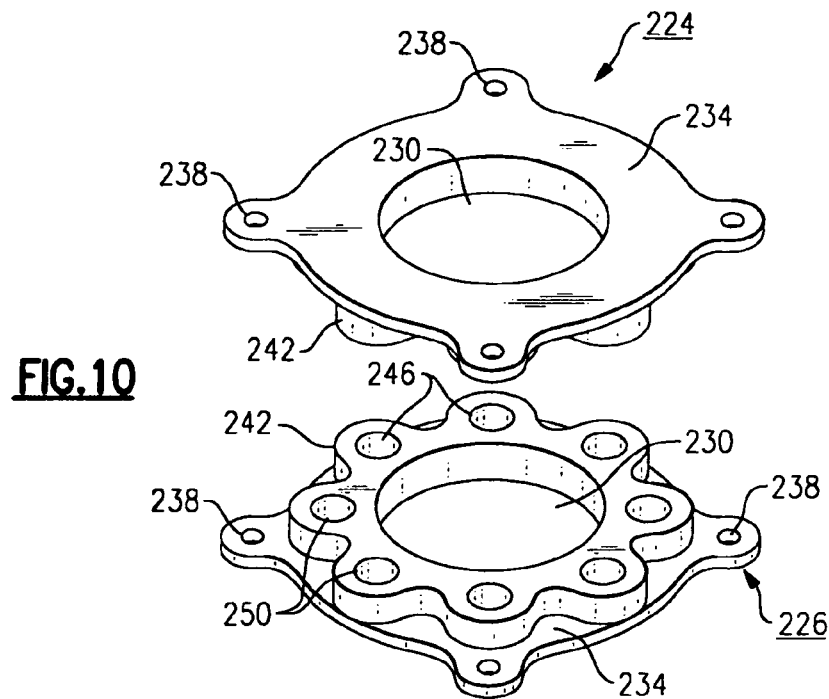
FIG. 10 is a perspective view of a magnetic bearing assembly used in the rotatable support structure of FIG. 9.
Figure 11:
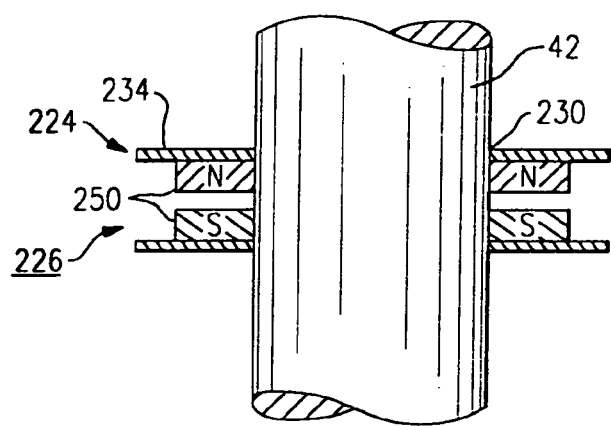
FIG. 11 is a partial side elevational view of the rotatable support stricture of FIGS. 9 and 10, depicting the alignment of the magnetic assembly to provide an optional indexing feature.

A second embodiment of a rotatable support apparatus 100 is herein described with reference to FIGS. 9-11. The same reference numerals will be used to label similar parts, for the sake of clarity.

The rotatable support apparatus 200, according to this embodiment, includes an upper display portion 218 and a stationary lower base portion 214, partially shown, each similarly constructed like that in FIGS. 4-8. As in the preceding, the upper display portion 218 is defined by a top plate 30, a bottom plate 34 and a plurality of display panels 22, 24 interconnected into a plurality of vertically extending corner posts 45, each of the posts including slots at either lateral side for receipting a peripheral edge and defining a frame 40. The frame 40 further includes a pair of cross braces 46 mounted to each top corner of the posts 45, defining a top portion 43 wherein the upper display portion 218 is further defined by a hollow interior.

Also and as in the preceding embodiment, a hollow shaft or pole member 42 is mounted to a bottom cover or plate (not shown) of the stationary lower base portion 214 and extends vertically through the interior of the lower base portion and through a plurality of corresponding openings formed in the top plate 33 of the lower base portion 214 and the bottom plate 34 of the upper display portion 218, respectively. A threaded insert 47 is provided at each end of the hollow shaft member 42 wherein the insert at the lower end (not shown) of the shaft member 42 is fixedly mounted to the bottom plate (not shown) of the lower base portion 214 and the threaded insert 47 at the upper end is attached to the top portion 43 of the frame 40. At the upper end of the upper display portion, the insert 47 includes a threaded shank 48 extending through a weldment 50 provided in one of the cross braces 46 wherein the shaft member 42 is secured to the upper display member 218 for rotation by a nut 59. The insert 47 also includes a pair of locking members 49 that engage the interior of the shaft member 42, as shown most clearly in FIG. 9. As in the preceding, a pair of magnets 52, 54 is further provided through which the threaded shank 48 extends, each of the magnets having corresponding center openings to permit the magnets to be provided axially. Each of the magnets 52, 54 are aligned with like polarity magnetic surfaces facing each other and defining a gap. As in the preceding, the upper magnet 52 is attached to the frame 40 of the upper display portion 218 and the lower magnet 54 is attached to the upper end of the shaft member 42 atop a pair of washers 53, 55. The nut 59 secures the assembly but is tightened only to permit a downward force to be applied causing the magnets 52, 54 to be biased into one another axially against their mutual repelling force and thereby creating a passive magnetic bearing assembly.

In addition and according to this embodiment, a pair of indexing guide members 224, 226 is attached to the bottom surface of the bottom plate 34 of the upper display portion 218 and the top surface of the top plate 31 of the stationary base portion 214, respectively. Each of the indexing guide members 224, 226 include a plurality of magnets 250 that are disposed peripherally about a center opening 230, each of the magnets being retained within one of a corresponding set of cavities 246 provided in each of the indexing guide members. Each guide member 224, 226 is secured to the upper display portion 218 and lower base portion 214, respectively, by means of fasteners (not shown) as attached through a plurality of mounting holes 238 provided in a base portion 234 of each guide member wherein the shaft member passes through the center opening 230 of each of each guide member. The magnets 250, as noted, are mounted by any convenient means into the cavities 246, the cavities being formed within an outer radial supporting section 242 thereof.

Each of the magnets 250 provided on each indexing member 224, 226 include an exposed magnetic surface wherein the exposed surfaces alternate in polarity circumferentially about the center opening 230 and when attached about the shaft member 42. In addition, the pair of indexing guide members is axially separated from one another by a spacing or gap that is defined by the length of the shaft member 42 passing through each of the lower base portion and upper display portion 218. The exposed magnetic surfaces of each indexing guide member 224, 226 are aligned such that opposite polarities are created when the upper display portion 218 has stopped rotating, therein causing the upper display portion to be aligned square to the base portion 214 at specific rotational positions (e.g., 0 degrees, 90 degrees, 180 degrees, 270 degrees, 360 degrees).

In addition, the indexing guide members 224, 226 can be used in lieu of the magnetic bearing assembly at the upper end of the upper display portion 218, wherein the sets of magnets 250 further create a passive magnetic bearing assembly that permits rotation of the upper display portion by a user.

PARTS LIST FOR FIGS. 1-11

10 rotatable support apparatus
14 lower base portion
18 upper display portion
21 lateral surface
22 lateral panel
23 lateral surface
24 lateral panel
30 top plate
31 top plate
33 bottom plate
34 bottom plate
40 frame
42 shaft or pole member
43 top portion
45 corner pieces/posts
46 cross braces
47 threaded insert
48 threaded shank
49 locking members
50 circular weldment
51 opening, circular weldment
52 magnet, upper
53 washer
54 magnet, lower
55 washer
56 gap or spacing, predetermined
57 opening
58 opening
59 nut
120 rotatable display apparatus
124 base portion, stationary
128 upper display portion, rotatable
132 top cover
136 bottom cover
140 lateral side facing panel
144 lateral side facing panel
148 lateral surfaces
152 top cover
156 bottom cover
160 pole or shaft
164 center axis
166 intermediate top panel
170 opening
180 threaded portion
181 nut
184 nut
185 nut
186 washer
188 insert
189 washer
200 rotatable support apparatus
214 stationary base portion
218 upper display portion
224 indexing guide member
226 indexing guide member
230 opening, center
234 base portion
238 mounting holes
242 supporting portion
246 cavities
250 magnets Though the apparatus has been described in terms of certain embodiments, it will be readily apparent that certain modifications and variations are available to those of ordinary skill in the field that are within the inventive ambits according to the following claims. That is, literally any other rotatable support structure that can utilize a center or even eccentrically mounted shaft member to enable rotation about a primary axis can incorporate the herein described passive magnetic bearing assembly such as, for example, any rotatable supporting structure that employs turntables or similar means including a stationary base and a rotatable section that supports files, documents or other materials.

We claim:

1. A rotatable support apparatus comprising:
    a stationary base section;
    an upper display section disposed above said base section;
    a shaft member extending through said base portion and said upper display portion, said shaft member having one end mounted to said stationary base section and defining an axis that permits rotation of said upper display section; and
    a pair of indexing members disposed in relation to said shaft member, said pair of indexing members including an opening sized for receiving said shaft member, each of said indexing members including a plurality of circumferentially disposed magnets each having an exposed magnetic surface, said pair of indexing members being attached to each of said upper display section and said base section, respectively, and being aligned such that a repelling field is initially established between said indexing members and in which like polarities are established between said indexing members when the upper display portion has ceased rotating to index said upper display portion relative to said stationary base portion, wherein the polarities of said plurality of circumferentially disposed magnets of each indexing member alternate in relation to each other such that a repelling magnetic field is created between said pair of indexing members during portions of rotation of said upper display portion and an attractive magnetic field is created during other portions of said rotation.

2. A rotatable support apparatus as recited in claim 1, including an insert wherein said insert includes a shank portion attachable to an upper part of said upper display portion and extending therethrough, said apparatus further including a nut for engaging onto said extending part of said shank portion.

3. A rotatable support apparatus as recited in claim 1, wherein said support apparatus is a display kiosk.

4. A rotatable support apparatus as recited in claim 1, wherein said magnetic bearing assembly is passive.

* * * * *